(12) United States Patent
Cheon et al.

(10) Patent No.: US 9,026,149 B2
(45) Date of Patent: May 5, 2015

(54) METHOD AND APPARATUS FOR DETERMINING LOCATION OF USER EQUIPMENT IN A COMMUNICATION SYSTEM

(75) Inventors: Jung-Hoon Cheon, Suwon-si (KR); Dae-Joong Kim, Yongin-si (KR); Sun-Young Choi, Seoul (KR); Ju-Mi Lee, Seoul (KR)

(73) Assignee: Samsung Electronics Co., Ltd, Suwon-Si (KR)

( * ) Notice: Subject to any disclaimer, the term of this patent is extended or adjusted under 35 U.S.C. 154(b) by 677 days.

(21) Appl. No.: 13/016,413

(22) Filed: Jan. 28, 2011

(65) Prior Publication Data

US 2011/0190005 A1 Aug. 4, 2011

(30) Foreign Application Priority Data

Jan. 29, 2010 (KR) ........................ 10-2010-0008786

(51) Int. Cl.
*H04W 24/00* (2009.01)
(52) U.S. Cl.
CPC ..................................... *H04W 24/00* (2013.01)
(58) Field of Classification Search
USPC ............ 455/456.5, 456.1; 340/539.13, 572.4; 342/357.29; 370/311
See application file for complete search history.

(56) References Cited

U.S. PATENT DOCUMENTS

| | | | |
|---|---|---|---|
| 2001/0000958 A1* | 5/2001 | Ulrich et al. .................. | 340/539 |
| 2003/0008669 A1* | 1/2003 | Stein et al. .................... | 455/456 |
| 2008/0186892 A1* | 8/2008 | Damnjanovic ................ | 370/311 |
| 2008/0274753 A1* | 11/2008 | Attar et al. ................. | 455/456.6 |
| 2009/0274059 A1* | 11/2009 | Xing et al. .................... | 370/252 |
| 2010/0048217 A1* | 2/2010 | Deshpande et al. .......... | 455/446 |
| 2010/0081451 A1* | 4/2010 | Mueck et al. .............. | 455/456.1 |
| 2010/0273504 A1* | 10/2010 | Bull et al. .................. | 455/456.1 |
| 2012/0184206 A1* | 7/2012 | Kim et al. ......................... | 455/9 |
| 2012/0322501 A1* | 12/2012 | Abouzid et al. ........... | 455/552.1 |

FOREIGN PATENT DOCUMENTS

EP 1448008 A1 * 8/2004

* cited by examiner

*Primary Examiner* — Amancio Gonzalez

(57) ABSTRACT

A method and apparatus for determining a location of a User Equipment (UE) in a communication system. A Base Station (BS) connected to a plurality of antennas by cable receives from each of the antennas reception signal information related to an uplink signal transmitted from the UE, identifies an antenna having a partial service area in which the UE is located, using the reception signal information, and determines the partial service area of the identified antenna to be the location of the UE.

20 Claims, 4 Drawing Sheets

METHOD AND APPARATUS FOR DETERMINING LOCATION OF USER EQUIPMENT IN A COMMUNICATION SYSTEM

CROSS-REFERENCE TO RELATED APPLICATION(S) AND CLAIM OF PRIORITY

The present application is related to and claims the benefit of priority under 35 U.S.C. §119(a) to a Korean Patent Application filed in the Korean Intellectual Property Office on Jan. 29, 2010 and assigned Serial No. 10-2010-0008786, the contents of which are incorporated herein by reference.

TECHNICAL FIELD OF THE INVENTION

The present invention relates to a method and apparatus for determining the location of a User Equipment (UE) using an uplink signal received from the UE in a communication system.

BACKGROUND OF THE INVENTION

A communication system generally determines the location of a UE based on the location of a Base Station (BS). The following schemes are used to locate a UE.

According to a location determination scheme in a network supporting a Global Navigation Satellite System (GNSS) (herein, referred to as a 'GNSS' scheme), both a BS and a UE are equipped with Global Positioning System (GPS) receivers and the BS estimates the location of the UE using signals received from GPS satellites. In the GNSS scheme, the BS notifies the UE of a list of satellites from which signals are to be received and the UE receives satellite signals according to the satellite list. Therefore, the battery consumption of the UE is reduced and only signals received from the satellites listed in the satellite list are used for location estimation.

A UE detects the cell Identifier (ID) of a BS based on such a signal as a paging message received from the BS and identifies the BS in which it is located using the cell ID. This is called an enhanced cell ID scheme. The enhanced cell ID scheme is complementary to a conventional cell ID scheme, for the purpose of more accurately locating a UE that is in a cell having a relatively large service area. That is, the distance between the UE and the BS and the heading of the UE are estimated using measurements of the UE and the BS in addition to the cell ID of the BS in the enhanced cell ID scheme. The measurements of the UE include a Received Signal Strength Indicator (RSSI), a Reference Signal Received Power (RSRP), and a Reference Signal Received Quality (RSRQ), and the measurements of the BS include a Time of Arrival (TA) and an Angle of Arrival (AoA).

A third scheme for locating a UE is an Observed Time Difference Of Arrival (OTDOA) scheme. A UE receives Positioning Reference Signals (PRSs) from a plurality of BSs at the same point of time and estimates the distances between the UE and two or more BSs using the TDOAs of the PRSs, thereby estimating its location.

The above conventional UE location determination schemes commonly estimate the location of a UE based on the location of a BS that is serving the UE, determined by a GPS receiver equipped in the UE.

However, when a BS is connected to a plurality of Remote Radio Heads (RRHs) to extend the service area of the BS, an RRH that is providing a service to a UE cannot be identified only based on the location of the BS. Therefore, it is difficult to accurately determine the location of the UE that is within the service area of the RRH.

SUMMARY OF THE INVENTION

To address the above-discussed deficiencies of the prior art, it is a primary object to provide at least the advantages described below. Accordingly, an aspect of embodiments of the present invention is to provide a method and apparatus for determining the location of a UE based on uplink signals received from the UE through a plurality of RRHs by a BS connected to the plurality of RRHs for coverage extension in the cell of the BS.

Another aspect of embodiments of the present invention is to provide a method and apparatus for detecting the partial service area of an RRH in which a UE is located within the whole service area of a BS, based on uplink signals received from the UE through a plurality of RRHs connected to the BS.

In accordance with an embodiment of the present invention, there is provided a method for determining a location of a UE by a BS connected to a plurality of antennas by cable, in which reception signal information related to an uplink signal transmitted from the UE is received through each of the antennas, an antenna having a partial service area in which the UE is located is identified using the reception signal information, and the partial service area of the identified antenna is determined to be the location of the UE.

In accordance with another embodiment of the present invention, there is provided a BS for determining a location of a UE in a communication system. The BS includes a receiver configured to receive through each of a plurality of antennas connected to the BS by cable reception signal information related to an uplink signal transmitted from the UE. The BS also includes a controller configured to identify an antenna having a partial service area in which the UE is located, use the reception signal information, and determine the partial service area of the identified antenna to be the location of the UE.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, the same drawing reference numerals will be understood to refer to the same elements, features and structures.

DETAILED DESCRIPTION OF THE INVENTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system.

The present invention provides a method for determining the location of a User Equipment (UE) in the partial service area of a Remote Radio Header (RRH) using uplink signals received at a plurality of RRHs from the UE within the cell of a Base Station (BS) connected to the plurality of RRHs for coverage extension. An RRH refers to a device used to extend the service area of a BS. As far as it transmits and receives BS signals, an antenna can be used as an RRH irrespective of shape, function and position.

According to the present invention, uplink signals used to determine the location of a UE include a Physical Random Access Channel (PRACH) signal, a Sounding Reference Signal (SRS), a Scheduling Request (SR) signal, and an Orthogonal Frequency Division Multiplexing (OFDM) symbol. A method for determining the location of a UE using each of the uplink signals will be described as an embodiment of the present invention.

It can be determined whether a UE exists within the service area of a BS, using a conventional BS location-based scheme, which will not be considered herein. The present invention will be described in the context of a star-shaped connection structure (refer to FIG. 1) in which a plurality of RRHs are connected to a BS, but not connected to one another.

Figure 1:
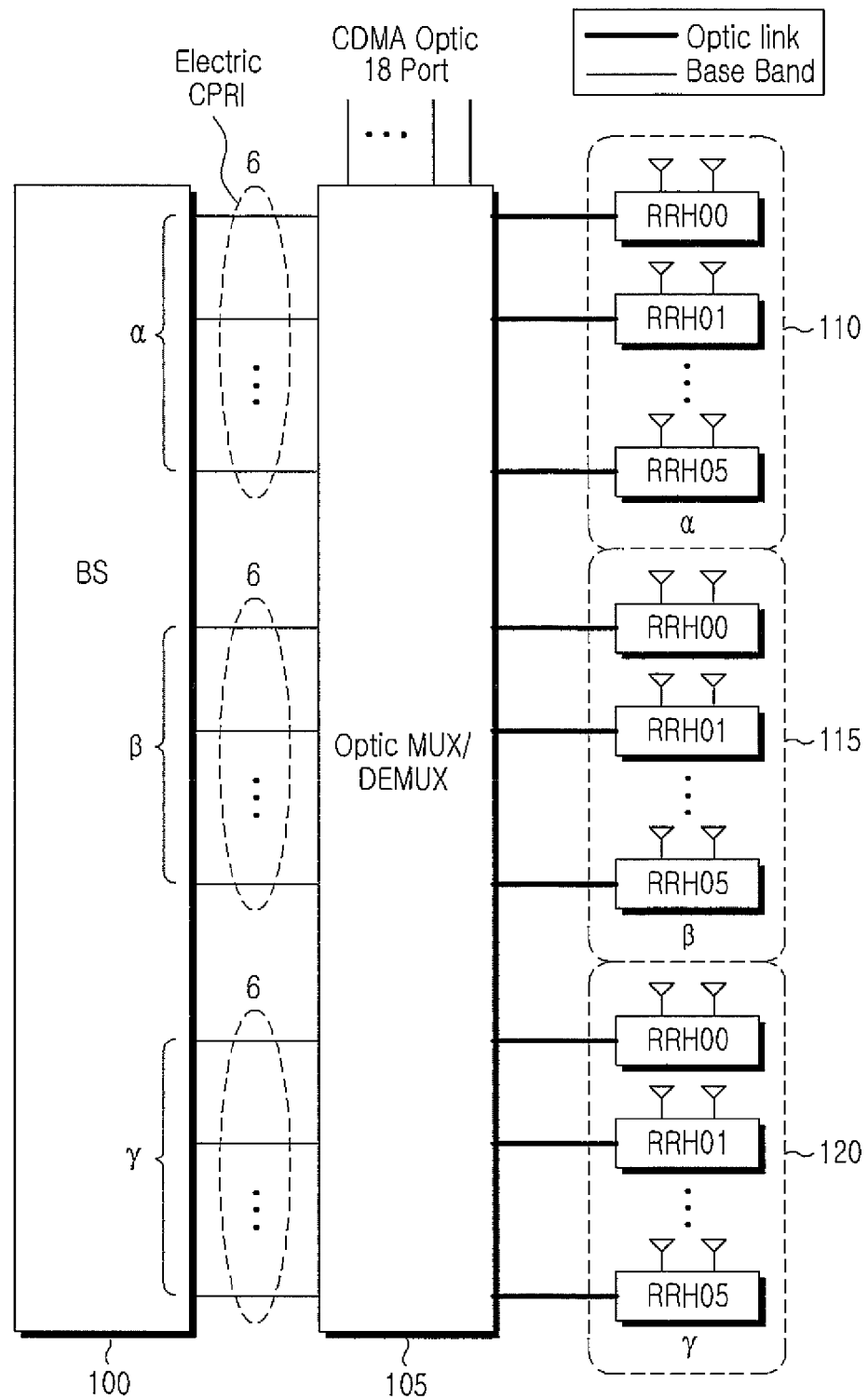
FIG. 1 illustrates a star-shaped connection between a Base Station (BS) and a plurality of Remote Radio Heads (RRHs) according to an embodiment of the present invention.

FIG. 1 illustrates a star-shaped connection between a BS and a plurality of RRHs according to an embodiment of the present invention.

Referring to FIG. 1, a BS 100 is divided into a Digital Unit (DU) part and a Radio Frequency (RF) part. The DU part is connected to the RF part through an optic Multiplexer/Demultiplexer (MUX/DEMUX) 105 by cable. The RF part includes RRHs that operate almost in the same manner as general antennas.

For example, it is assumed that the whole service area of the BS 100 is divided into three sectors α, β and γ and the optic MUX/DEMUX 105 is connected to up to six RRHs for each of the partial service areas of the sectors α, β and γ. That is, RRH groups 110, 115 and 120 each including six RRHs to serve the partial service areas of the sectors α, β and γ are connected to the BS 100 by cable. The BS 100 has prior knowledge of the locations of the respective RRHs of each RRH group 110, 115 or 120 by means of Global Positioning System (GPS) devices mounted on the RRH groups 110, 115 and 120. Alternatively or additionally, the BS 100 maps information about the location of each RRH of the RRH groups 110, 115 and 120 to identification numbers (hereinafter, referred to as 'RRH numbers') using information about the latitudes and longitudes of the RRHs of the RRH groups 110, 115 and 120 entered manually during initial installation and stores the mapped RRH location information and RRH numbers. It is also assumed that the RRH number of each RRH group is manually input during the initial installation. The BS 100 transmits and receives signals in the following paths.

A reception path of the BS 100 will first be described. When the BS 100 receives user data from its upper node, an Evolved Packet Core (EPC), the user data passes through a network matching module and is transferred to the DU part of the BS 100 via an Ethernet switch (not shown). The user data is subjected to baseband digital processing, converted to a signal suitable for a Common Public Radio Interface (CPRI), and then converted to an optical signal through electrical-to-optic conversion at the DU part. The optic signal is transmitted to a specific RRH at a remote place via an optic cable connected to the optic MUX/DEMUX 105. Upon receipt of the optic signal, the RRH converts the received optic signal to an electrical signal, converts the digital electrical signal to an analog signal, and transmits the analog signal through a high-power amplifier (not shown), a filter unit (not shown), and an antenna.

Regarding a transmission path of the BS 100, upon receipt of an RF signal, an RRH in the RRH groups 110, 115 and 120 filters the received signal through a filter unit (not shown) and low-noise amplifies the filtered signal through a Low-Noise Amplifier (LNA) (not shown). The low-noise amplified signal is converted to a baseband signal through RF downconversion and digital downconversion. The baseband signal is converted to a signal suitable for a CPRI and then converted to an optic signal. The optic signal is transmitted to the DU part of the BS 100 via the optic MUX/DEMUX 105 connected to the RRH by an optic cable. The DU part of the BS 100 subjects the optic signal to Single-Carrier Frequency Division Multiple Access (SC-FDMA) processing, converts the SC-FDMA signal to a gigabit Ethernet frame, and transmits the gigabit Ethernet frame to the EPC.

The present invention provides a method for determining the location of a UE in the service area of a BS configured as illustrated in FIG. 1. The following description is given with the appreciation that a BS has the configuration illustrated in FIG. 1.

Specifically, an embodiment of the present invention provides a method for determining the locations of UEs that initially access a BS, and another embodiment of the present invention provides a method for determining the location of a UE that moves from the partial service area of one RRH to the partial service area of another RRH within the same BS. A further embodiment of the present invention provides a method for determining the location of a UE using an SR signal or OFDM symbols.

The method for determining the location of a UE that initially accesses a BS according to the first embodiment of the present invention will first be described. Herein, an embodiment in which a plurality of UEs initially access a BS will be taken as an example.

UEs transmit PRACH signals to a BS which they intend to initially access. In general, a PRACH is a physical channel on which a BS receives a preamble sequence from a UE to acquire synchronization with the UE. To use the PRACH, the BS transmits PRACH configuration information to UEs in System Information Block (SIB)-2 or a Radio Resource Control (RRC) message. The PRACH configuration information indicates the position of a frequency at which the UE is supposed to transmit the preamble sequence and the format of the preamble sequence. For example, the PRACH configuration information includes Prach-ConfigInfo [6 bits], rootSequenceIndex [10 bits], zeroCorrelationZoneConfig [4 bits], and high-SpeedFlag [1 bit]. Prach-ConfigInfo specifies an access slot configuration in which the UE is supposed to transmit the preamble sequence. The access slot configuration provides a system frame number and a subframe number that are determined based on a preset uplink frame configuration in order to indicate a frequency position. The preamble sequence format includes a root sequence index, cycle shift separation, and a high-speed flag.

Upon receipt of the PRACH signals from the UEs, each RRH connected to the BS identifies a UE that is located within its service area according to the reception strengths of the PRACH signals. Then the RRH transmits reception signal information including its RRH number, the reception strengths of the PRACH signals, and the IDs of UEs that transmitted the PRACH signals, mapped to the reception strengths of the PRACH signals.

The BS creates a location mapping table based on the reception signal information. For example, if four UEs attempt to initially access the service area of the BS, it is assumed that the BS makes a location mapping table based on reception signal information received from the RRHs of an RRH group having partial service areas corresponding to the sector α. Thus, the six RRHs used to serve partial service areas corresponding to the sector α form the RRH group 110.

The BS receives reception signal information from the respective RRHs of the RRH group 110 and generates a location mapping table using the reception strengths of PRACH signals, the IDs of UEs that transmitted the PRACH signals, and the RRH numbers of RRHs that received the PRACH signals, included in the reception signal information, as illustrated in Table 1.

TABLE 1

|  | UE 1 | UE 2 | UE 3 | UE 4 |
| --- | --- | --- | --- | --- |
| RRH 1 | weak | strong | medium | medium |
| RRH 2 | strong | Weak | weak | medium |
| RRH 3 | medium | Medium | weak | weak |
| RRH 4 | medium | Medium | strong | weak |
| RRH 5 | medium | Medium | medium | weak |
| RRH 6 | medium | Weak | weak | strong |

The reception strength of each PRACH signal is expressed as 'strong', 'medium' or 'weak'. Each RRH of the RRH group 110 determines which predetermined strength range corresponding to 'strong', 'medium' or 'weak' the strengths of received PRACH signals fall into. Then the RRH determines 'strong', 'medium' or 'weak' for the PRACH signals according to the determination result and then transmits reception signal information including information indicating the determined signal strengths 'strong', 'medium' or 'weak' for the PRACH signals to the BS.

The BS determines a UE corresponding to a UE ID mapped to the reception strength 'strong' set in reception signal information received from an RRH to be located within the service area of the RRH. The predetermined reception strength ranges corresponding to 'strong', 'medium' and 'weak' are beyond the scope of the present invention and will not be described in detail herein.

More specifically, referring to Table 1, a PRACH signal received from UE 2 is 'strong' at RRH 1 and thus the BS determines that UE 2 is located within the partial service area of RRH 1. At RRH 2, a PRACH signal received from UE 1 is 'strong' and thus the BS determines that UE 1 is within the partial service area of RRH 2. The BS determines that UE 3 is located within the partial service area of RRH 4 because RRH 4 has received a 'strong' PRACH signal from UE 3. RRH 6 has received a 'strong' PARCH signal from UE 4 and thus the BS determines that UE 4 is within the partial service area of RRH 6.

RRH 3 and RRH 5 have not received a 'strong' PRACH signal from any UE. Therefore, the BS determines that no UE exists within the partial service areas of RRH 3 and RRH 5.

Figure 2:
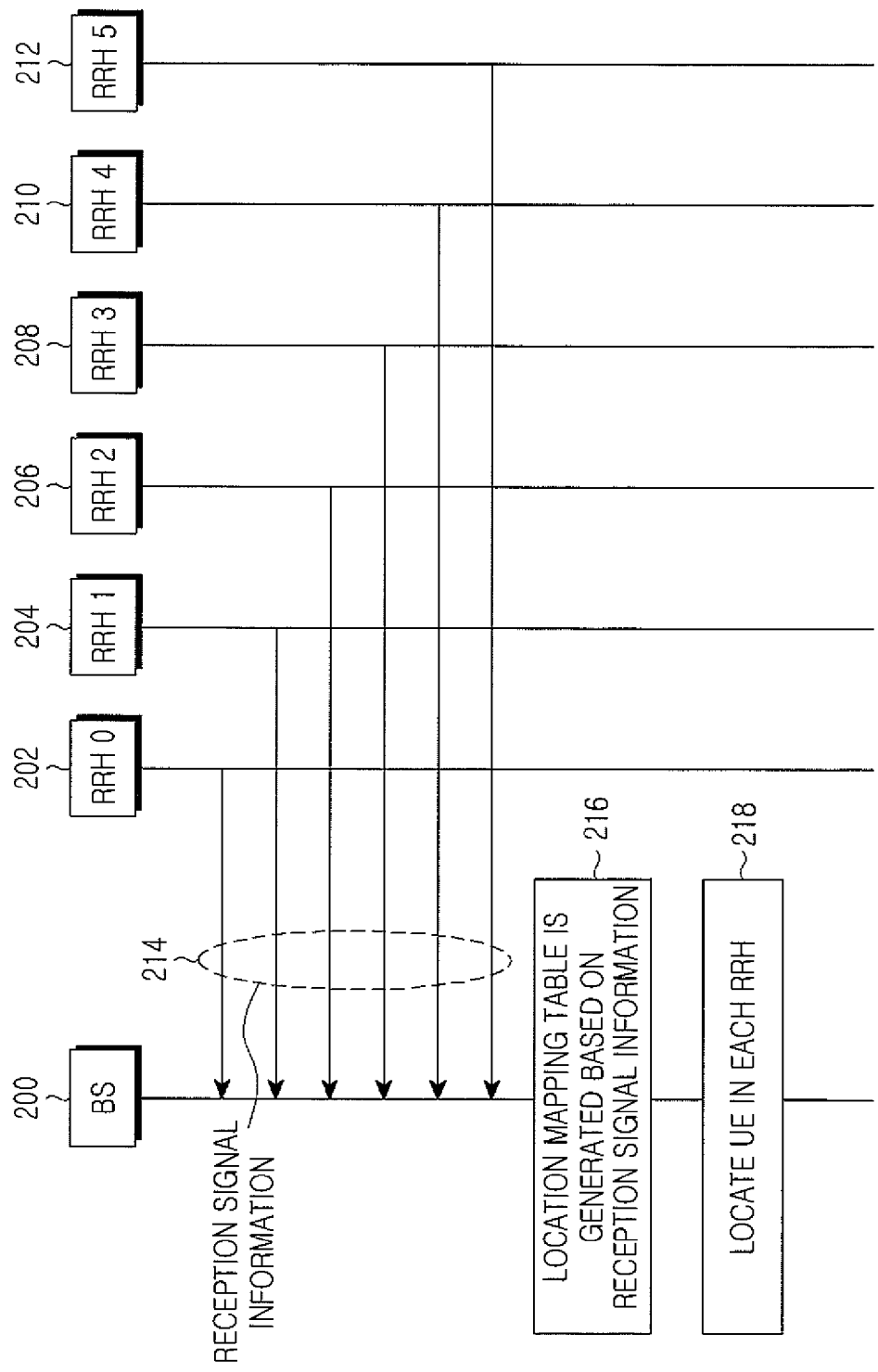
FIG. 2 illustrates a signal flow for determining the location of a User Equipment (UE) according to an embodiment of the present invention.

FIG. 2 is a diagram illustrating a signal flow for determining the location of a UE according to an embodiment of the present invention. It is assumed herein that a BS 200 is connected to six RRHs 202, 204, 206, 208, 210 and 212 (RRH 0 to RRH 5). Because up to 24 RRHs can be connected to the BS 200, it is obvious that the present invention is applicable to a configuration other than illustrated in FIG. 2.

Referring to FIG. 2, the BS 200 receives reception signal information from each of all RRHs connected to the BS 200, that is, RRH 0 to RRH 5 in step 214. The reception signal information received from each RRH specifies the strengths of PRACH signals received at the RRH, the IDs of UEs that transmitted the PRACH signals, and the RRH number of the RRH that received the PRACH signals.

In step 216, the BS 200 creates a location mapping table based on the reception signal information received from RRH 0 to RRH 5. The BS 200 then detects UEs having UE IDs mapped to PRACH signals having the reception strength 'strong' in the reception signal information received from RRH 0 to RRH 5 and determines the detected UEs to be located in the partial service areas of RRH 0 to RRH 5 in step 218.

Apart from the reception strengths of PRACH signals received from UEs the RRHs connected to the BS 200, the BS 200 can determine the locations of the UEs using the TAs of the PRACH signals.

More specifically, each RRH connected to the BS 200 receives PRACH signals from UEs and the BS 200 determines the locations of the UEs based on the TAs of the PRACH signals. In general, UEs transmit PARCH signals to a BS that they are to initially access. Among RRHs connected to the BS 200, RRHs that have received the PRACH signals from the UEs transmit reception signal information to the BS 200. The reception signal information from each of the RRHs contains the RRH number of the RRH, the TAs of the PRACH signals, and the UE IDs of the UEs that transmitted the PARCH signals, mapped to the TAs of the PRACH signals.

Then the BS 200 makes a location mapping table based on the reception signal information. For example, if four UEs are to initially enter the service area of the BS 200, it is assumed that the BS 200 makes a location mapping table based on reception signal information received from a group of RRHs having partial service areas corresponding to sector α of the BS 200. It is assumed that six RRHs having the partial service areas corresponding to sector α of the BS form the RRH group 110 in FIG. 1.

The BS 200 receives reception signal information from each RRH of the RRH group 110 and creates the location mapping table illustrated in Table 1-1 using the TAs of PRACH signals, UE IDs of the UEs that transmitted the PRACH signals, and the RRH numbers of the RRHs that received the PRACH signals, included in the reception signal information.

TABLE 1-1

|       | UE 1 | UE 2 | UE 3 | UE 4 |
|-------|------|------|------|------|
| RRH 1 | 3    | 1    | 2    | 2    |
| RRH 2 | 1    | 3    | 3    | 2    |
| RRH 3 | 2    | 2    | 3    | 3    |
| RRH 4 | 2    | 2    | 1    | 3    |
| RRH 5 | 2    | 2    | 2    | 3    |
| RRH 6 | 2    | 3    | 3    | 1    |

Each RRH detects sampling times or BS clock times at which the correlations of PRACH signals are peaks, and transmits reception signal information, including information about the detected sampling times or BS clock times as the TAs of the PARCH signals to the BS. Specifically, the RRHs operating in synchronization transmit to the BS reception signal information including time information indicating the arrival order of the PRACH signals transmitted by the UEs, along with the IDs of the UEs that transmitted the PRACH signals and the RRH numbers of the RRHs. The TAs of the PRACH signals may be expressed as the absolute times of sampling times or BS clock times or the relative times of sampling times or BS clock times with respect to a reference clock signal. Table 1-1 is a location mapping table using relative times with respect to a reference clock signal. If the whole system is synchronous, the arrival order of PRACH signals received from UEs can be determined for each RRH. Therefore, RRHs connected to another BS as well as the RRHs connected to the BS may transmit information about specific UEs used to create the location mapping table illustrated in Table 1-1 to the BS, for use in determining the locations of the UEs.

The BS determines a UE having a UE ID mapped to the earliest TA of PRACH signals in reception signal information received from an RRH to be located within the service area of the RRH.

Referring to Table 1-1, a PRACH signal from UE 2 arrived earliest at RRH 1 and thus the BS determines that UE 2 is located within the partial service area of RRH1. A PRACH signal from UE 1 reached RRH 2 earliest and thus the BS determines that UE 1 is in the partial service area of RRH 2. Since RRH 4 received a PRACH signal from UE 3 earliest, the BS determines that UE 3 is within the partial service area of RRH 4. For RRH 6, a PRACH signal from UE 4 is the earliest one. Thus the BS determines that UE 4 is located within the partial service area of RRH 6.

RRH 3 and RRH 5 did not receive PRACH signals from any UEs earliest. Hence, the BS determines that no UEs are within the partial service areas of RRH 3 and RRH 5.

Now a description will be given of a method for determining the location of a UE that moves from the partial service area of one RRH connected to a BS to the partial service area of another RRH connected to the same BS according to another embodiment of the present invention. While moving between the partial service areas of RRHs connected to the same BS, a UE does not transmit a PRACH signal, unlike during initial access. Accordingly, the location of a UE that moves between the partial service areas of RRHs connected to the same BS is determined using an SRS.

In general, an SRS is a reference signal by which a UE reports a channel state to a BS. The BS presets SRS configuration information and transmits the SRS configuration information to UEs in SIB-2 so that the UEs can transmit SRSs.

The SRS configuration information includes cell-specific parameters and UE-specific parameters. The cell-specific parameters contain an SRS bandwidth configuration, a sub-band configuration, an ACKnowledgement/Negative ACKnowledgment (ACK/NACK), and SRS simultaneous TX information. The UE-specific parameters contain an SRS bandwidth, an SRS hopping bandwidth, a frequency-domain position, a subframe offset, a duration, and SRS periodicity.

Upon receipt of the SRS configuration information, a UE transmits an SRS in a period set in the SRS configuration information.

Upon receipt of SRSs from UEs, the RRHs connected to the BS transmit SRS reception information to the BS. The SRS reception information from each RRH includes the RRH number of the RRH that received SRSs, the reception strengths of the SRSs, and the IDs of UEs that transmitted the SRSs.

Then the BS generates a location mapping table based on the SRS reception information. The location mapping table is similar to Table 1, except that the reception strengths of SRSs substitute for the reception strengths of PRACH signals.

According to the first embodiment of the present invention, the reception strength of an SRS is expressed as 'strong', 'medium' or 'weak'. That is, each RRH determines which predetermined strength range corresponding to 'strong', 'medium' or 'weak' the strength of each received SRS falls into. Then the RRH determines 'strong', 'medium' or 'weak' for the SRS according to the determination result and then transmits SRS reception information including information indicating the determined signal strengths 'strong', 'medium' or 'weak' for the SRSs to the BS.

The BS determines a UE having a UE ID mapped to the reception strength 'strong' set in SRS reception information received from an RRH to be located within the service area of the RRH. The predetermined reception strength ranges corresponding to 'strong', 'medium' and 'weak' are beyond the scope of the present invention and will not be described in detail herein.

Figure 3:
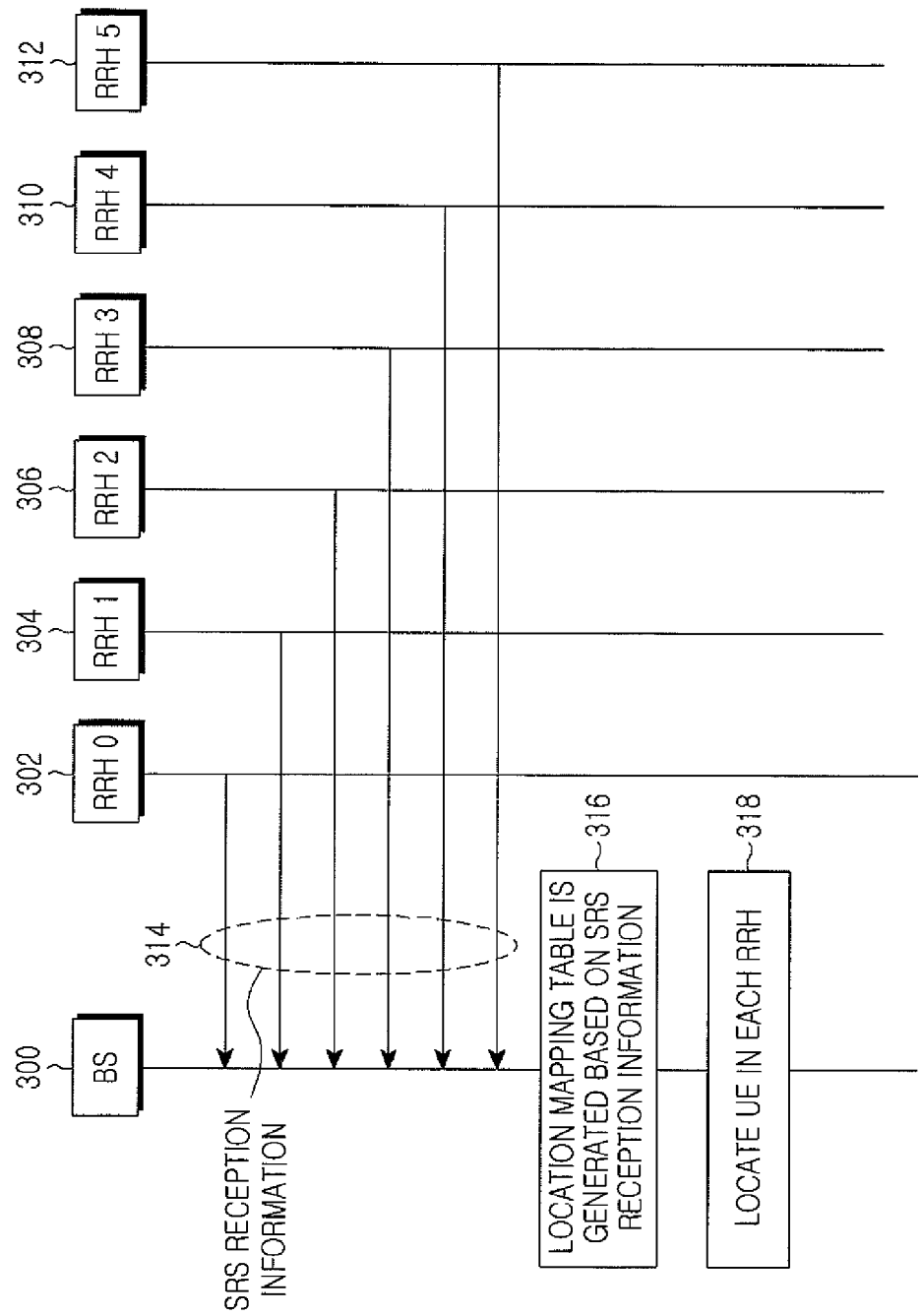
FIG. 3 illustrates a signal flow for determining the location of a UE according to another embodiment of the present invention.

FIG. 3 is a diagram illustrating a signal flow for determining the location of a UE according to the second embodiment of the present invention. It is assumed herein that a BS 300 is connected to six RRHs 302, 304, 306, 308, 310 and 312 (RRH 0 to RRH 5).

Referring to FIG. 3, the BS 300 receives SRS reception information from each of RRH 0 to RRH 5 in step 314. The SRS reception information specifies the strengths of SRSs received at the RRH, the IDs of UEs that transmitted the SRSs, and the RRH number of the RRH that received the SRSs.

In step 316, the BS 300 creates a location mapping table based on the SRS reception information received from RRH 0 to RRH 5. The BS then detects UEs having UE IDs mapped to the reception strength 'strong' of SRSs in the SRS reception information received from RRH 0 to RRH 5 and determines the UEs to be located in the partial service areas of RRH 0 to RRH 5 in step 318.

Apart from PRACH signals and SRSs received from UEs at the RRHs connected to the BS, the BS can determine the locations of the UEs using another signal such as an SR signal or OFDM symbols.

A method for determining the location of a UE using an SR signal will first be described. An SR signal is used for a UE in RRC-connected state with a BS to request resources for new data transmission to the BS. It is assumed herein that UEs transmit SR signals to a BS, in RRC-connected state. A procedure for establishing an RRC connection between a BS and a UE is not described herein in detail because it is out of the scope of the present invention.

Upon receipt of SR signals from RRC-connected UEs, each of a plurality of RRHs connected to the BS transmits SR reception information in relation to the received SR signals to the BS. The SR reception information includes the RRH number of the RRH that received the SR signals, the reception strengths of the SR signals, and the IDs of the UEs that transmitted the SR signals.

Then the BS generates a location mapping table based on the SR reception information. The location mapping table is similar to Table 1, except that the reception strengths of SR signals substitute for the reception strengths of PRACH signals. According to the foregoing embodiments of the present invention, the reception strength of an SR signal is expressed as 'strong', 'medium', or 'weak'. That is, each RRH determines which reception strength range each of received SR signals falls into and identifies the reception strength 'strong', 'medium', or 'weak' corresponding to the determined reception strength range. Then the RRH transmits SR reception information including information indicating the reception strengths 'strong', 'medium', or 'weak' for the SR signals to the BS.

The BS determines a UE having a UE ID mapped to the reception strength 'strong' set in SR reception information received from an RRH to be located within the service area of the RRH. The predetermined reception strength ranges corresponding to 'strong', 'medium', and 'weak' are beyond the scope of the present invention and will be described in detail herein.

Now a description will be given of a method for determining the location of a UE using OFDM symbols. The OFDM symbols are data symbols and pilot symbols transmitted in an uplink Resource Block (RB) that a BS has allocated to a UE, that is, a Physical Uplink Control Channel (PUCCH) and a Physical Uplink Shared Channel (PUSCH). It is assumed herein that the location of a UE is determined using pilot symbols of the PUCCH and the PUSCH. It is assumed that UEs transmitting such OFDM symbols to a BS are in RRC-connected state. A procedure for allocating an uplink RB to a UE by a BS is not described herein in detail because it is out of the scope of the present invention.

Upon receipt of OFDM symbols from UEs, each of a plurality of RRHs connected to the BS transmits OFDM symbol reception information in relation to the received OFDM symbols to the BS. The OFDM symbol reception information includes the RRH number of the RRH that received the OFDM symbols, the reception strengths of the OFDM symbols, and the IDs of the UEs that transmitted the OFDM symbols.

Then the BS generates a location mapping table based on the OFDM symbol reception information. The location mapping table is similar to Table 1, except that the reception strengths of OFDM symbols substitute for the reception strengths of PRACH signals. According to the foregoing embodiments of the present invention, the reception strength of OFDM symbols is expressed as 'strong', 'medium', or 'weak'. That is, each RRH determines which reception strength range OFDM symbols fall into and identifies the reception strength 'strong', 'medium', or 'weak' corresponding to the determined reception strength range. Then the RRH transmits OFDM symbol reception information including information indicating the reception strengths 'strong', 'medium', or 'weak' of the OFDM symbols to the BS.

The BS determines a UE having a UE ID mapped to the reception strength 'strong' set in OFDM symbol reception information received from an RRH to be located within the service area of the RRH. The predetermined reception strength ranges corresponding to 'strong', 'medium' and 'weak' are beyond the scope of the present invention and will not described in detail herein.

Since the location of a UE is determined using the strength of a signal received from the UE at an RRH, this obviates the need for system synchronization in locating the UE. When needed, a BS may receive data used for creating a location mapping table such as Table 1 from RRHs connected to neighbor BSs, for use in locating a UE.

When a BS uses the strengths of signals received at an RRH in locating a UE, the strengths of the signals received during a predetermined time period may be accumulated to increase the measurement accuracy of the signal strengths. Then the BS may make a location mapping table such as Table 1 using the accumulated signal strengths and may locate a UE using the location mapping table. A measurer for measuring signal strengths may be included in each RRH, an RRH controller, or a BS. The predetermined time period during which signal strengths are accumulated is out of the scope of the present invention and thus will not be described herein.

Another embodiment for determining the location of a UE using OFDM symbols will be described below. In general, an OFDM system uses pilot symbols to measure reception strength and acquire symbol synchronization. Herein, the TDOAs of pilot symbols are used to locate a UE. UEs that transmit SR signals are assumed to be in RRC-connected state with a BS. A procedure for allocating an uplink RB to a UE by a BS will not be described in detail herein, because it is out of the scope of the present invention.

Upon receipt of OFDM symbols from UEs, each RRH connected to the BS transmits OFDM symbol reception information in relation to the received OFDM symbols to the BS. The OFDM symbol reception information includes the RRH number of the RRH that received the OFDM symbols, the TAs of the OFDM symbols, and the IDs of the UEs that transmitted the OFDM symbols.

Then the BS generates a location mapping table based on the OFDM symbol reception information. The location mapping table is similar to Table 1-1, except that the TAs of OFDM symbols substitute for the TAs of PRACH signals. According to the foregoing embodiments of the present invention, the TAs of OFDM symbols may be expressed as the absolute times of sampling times or BS clock times or the relative times of sampling times or BS clock times with respect to a reference clock signal. If the whole system is synchronous, the arrival order of OFDM symbols received from UEs can be determined for each RRH. Therefore, RRHs connected to another BS as well as the RRHs connected to the BS may transmit information about specific UEs used to create the mapping table illustrated in Table 1-1 to the BS, for use in determining the locations of the UEs.

Then the BS detects a UE having a UE ID mapped to the earliest TA of OFDM symbols in OFDM symbol reception information received from an RRH and determines the UE to be located in the partial service area of the RRH.

As a further embodiment of the present invention, the BS may determine the locations of UEs, using the strengths of PRACH signals, SRSs, SR signals, PUCCH signals and PUSCH signals received from UEs at the RRHs connected to the BS in combination with the TAs of these signals. It is possible to assign weights to strength-TA combinations.

Figure 4:
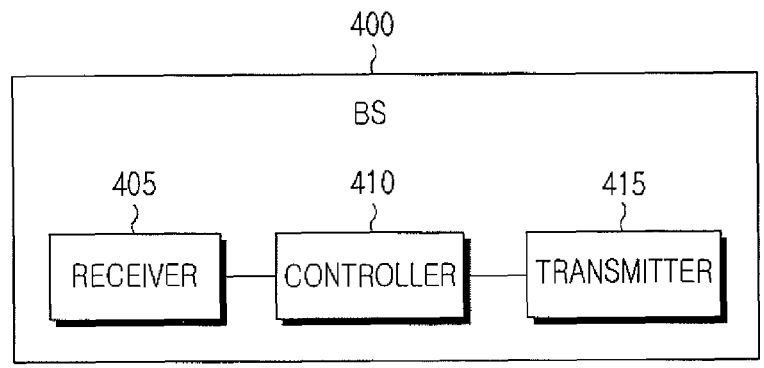
FIG. 4 illustrates a BS according to an embodiment of the present invention.

FIG. 4 is a block diagram of a BS according to an embodiment of the present invention.

Referring to FIG. 4, a BS 400 includes a receiver 405, a controller 410, and a transmitter 415. While not shown, the BS 400 is connected to a plurality of RRHs.

The controller 410 sets an uplink signal reception configuration in which the BS 400 can receive uplink signals from UEs within the service area of the BS 400. The uplink signals include PRACH signals received from UEs that initially access the BS, SRSs, SR signals, and OFDM symbols.

The controller 410 sets PRACH configuration information to receive PRACH signals from initially accessing UEs, and sets SRS configuration information to receive SRSs from UEs. In addition, the controller 410 establishes RRC connections with UEs from which to receive SR signals or allocates uplink RBs to UEs.

The controller 410 controls the transmitter 415 to transmit the PRACH configuration information, the SRS configuration information, RRC connection information, or uplink RB information to UEs within the service area of the BS 400. The transmitter 415 transmits to UEs within the partial service areas of the RRHs connected to the BS 400 the PRACH configuration information, the SRS configuration information, the RRC connection information, or the uplink RB information via the RRHs.

The receiver 405 receives reception signal information related to PRACH signals received from initially accessing UEs from each of the RRHs. The reception signal information includes the reception strengths of PRACH signals received at the RRH, the IDs of UEs that transmitted the PRACH signals, and the RRH number of the RRH.

The controller 410 generates a location mapping table based on the received signal information. The controller 410 determines a UE having a UE ID mapped to the reception strength 'strong' set in reception signal information received from an RRH to be located within the service area of the RRH.

The receiver 405 also receives SRS reception information related to SRSs received from UEs that are moving between the partial service areas of RRHs from each of the RRHs. The SRS reception information includes the reception strengths of SRSs received at the RRH, the IDs of UEs that transmitted the SRSs, and the RRH number of the RRH.

The controller 410 generates a location mapping table based on the SRS reception information. The controller 410 determines a UE having a UE ID mapped to the reception strength 'strong' set in SRS reception information received from an RRH to be located within the service area of the RRH.

The receiver 405 also receives SR reception information related to SR signals received from UEs from each of the RRHs. The SR reception information includes the reception strengths of SR signals received at the RRH, the IDs of UEs that transmitted the SR signals, and the RRH number of the RRH.

The controller 410 generates a location mapping table based on the SR reception information. The controller 410 determines a UE having a UE ID mapped to the reception strength 'strong' set in SR reception information received from an RRH to be located within the service area of the RRH.

The receiver 405 also receives OFDM symbol reception information related to OFDM symbols received from UEs that are moving between the service areas of RRHs from each of the RRHs. The OFDM symbol reception information includes the reception strengths of OFDM symbols received at the RRH, the IDs of UEs that transmitted the OFDM symbols, and the RRH number of the RRH.

The controller 410 generates a location mapping table based on the OFDM symbol reception information. The controller 410 determines a UE having a UE ID mapped to the reception strength 'strong' set in OFDM symbol reception information received from an RRH to be located within the service area of the RRH.

Figure 5:
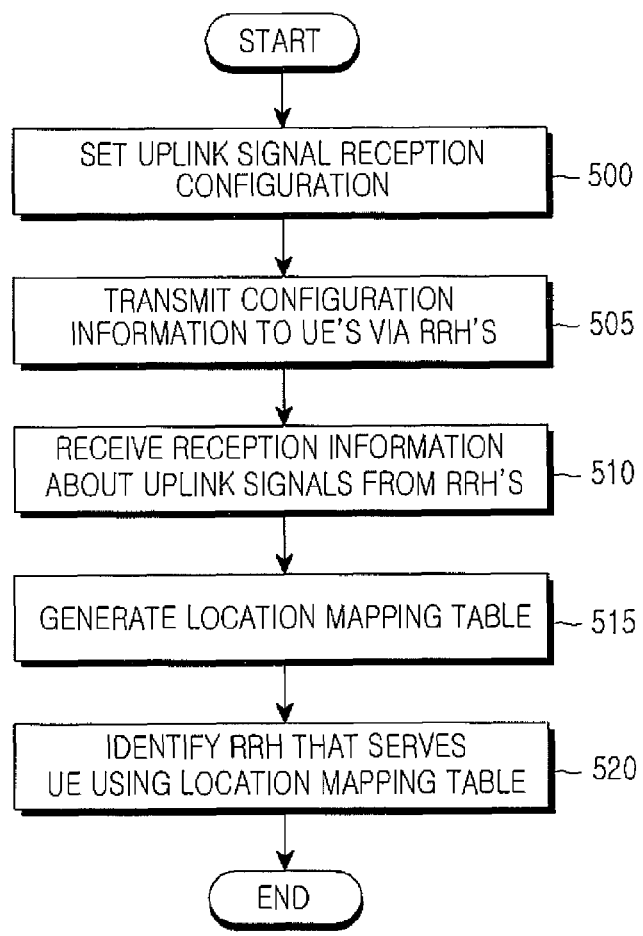
FIG. 5 illustrates an operation for determining the location of a UE in the BS according to an embodiment of the present invention.

FIG. 5 is a flowchart illustrating an operation for determining the location of a UE in a DS according to an embodiment of the present invention.

Referring to FIG. 5, the BS sets an uplink signal reception configuration to receive uplink signals from UEs in step 500. The uplink signals include PRACH signals, SRSs, SR signals, or OFDM symbols.

In step 505, the BS transmits configuration information to UEs within the partial service areas of RRHs connected to the BS via the RRHs.

The BS receives reception information related to uplink signals received from UEs from the RRHs in step 510. The reception information from an RRH includes the reception strengths of uplink signals received form UEs, the IDs of the UEs, and the RRH number of the RRH.

The BS generates a location mapping table based on the reception information in step 515 and determines the locations of the UEs based on the location mapping table in step 520. That is, the BS determines a UE having a UE ID mapped to the reception strength 'strong' set in OFDM symbol reception information received from an RRH to be located within the service area of the RRH.

In this manner, the BS identifies RRHs that service UEs within their partial service areas, using uplink signals received from the UEs through the RRHs. Therefore, the BS can more accurately determine the locations of the UEs.

As is apparent from the above description, in a cell that includes a BS connected to a plurality of RRHs to extend the coverage of the BS, the ES identifies the partial service area of an RRH in which a UE is located, using uplink signals received from the UE at the RRHs. Therefore, the location of the UE can be determined more accurately.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for determining a location of a User Equipment (UE) by a Base Station (BS) connected to a plurality of antennas by cable, the method comprising:

receiving, through each of the antennas, reception signal information related to an uplink signal transmitted from the UE; and identifying an antenna having a partial service area in which the UE is located using the reception signal information; and determining the partial service area of the identified antenna to be the location of the UE, wherein the reception signal information comprises a reception strength of the uplink signal, the reception strength of the uplink signal being expressed as one of a plurality of reception strength levels, each reception strength level corresponding to a different predetermined strength range, the one reception strength level corresponding to the predetermined strength range in which the reception strength of the uplink signal is included.

2. The method of claim 1, wherein the reception signal information further comprises an Identifier (ID) of the UE that transmitted the uplink signal and an identification number of the antenna that received the uplink signal.

3. The method of claim 2, wherein the uplink signal is one of a Physical Random Access Channel (PRACH) signal, a Sounding Reference Signal (SRS), a Scheduling Request (SR) signal, and an Orthogonal Frequency Division Multiplexing (OFDM) symbol.

4. The method of claim 2, wherein determining the partial service area of the identified antenna to be the location of the UE comprises:
acquiring, from the each of the reception signal information corresponding to each of the antennas, reception strengths of uplink signals received from each of the antennas, IDs of UEs that transmitted each of the uplink signals, and identification numbers of the antennas;
generating a location mapping table by mapping the reception strength of the uplink signal for each ID of UEs received in each of the antennas for the identification number of each of the antennas; and
determining a partial service of a antenna receiving the uplink signal with a reception strength corresponding to a maximum reception strength level for the each of the UEs as a location of the each of the UEs.

5. The method of claim 4, wherein the reception strength levels comprise a "weak" level, a "medium" level, and a "strong" level.

6. The method of claim 1, wherein the antennas comprise Remote Radio Heads (RRHs) arranged in a star-shaped connection structure.

7. The method of claim 1, wherein an entire service area of the BS comprises a plurality of partial service areas, each of the partial service areas corresponding to a service area for each of the antennas.

8. A Base Station (BS) for determining a location of a User Equipment (UE) in a communication system, the BS comprising:
a receiver configured to receive through each of a plurality of antennas connected to the BS by cable reception signal information related to an uplink signal transmitted from the UE; and
a controller configured to identify an antenna having a partial service area in which the UE is located, use the reception signal information, and determine the partial service area of the identified antenna to be the location of the UE,
wherein the reception signal information comprises a reception strength of the uplink signal, the reception strength of the uplink signal being expressed as one of a plurality of reception strength levels, each reception strength level corresponding to a different predetermined strength range, the one reception strength level corresponding to the predetermined strength range in which the reception strength of the uplink signal is included.

9. The BS of claim 8, wherein the reception signal information further comprises an identifier (ID) of the UE that transmitted the uplink signal and an identification number of the antenna that received the uplink signal.

10. The BS of claim 9, wherein the uplink signal is one of a Physical Random Access Channel (PRACH) signal, a Sounding Reference Signal (SRS), a Scheduling Request (SR) signal, and an Orthogonal Frequency Division Multiplexing (OFDM) symbol.

11. The BS of claim 9, wherein the controller is configured to:
acquire, from the each of the reception signal information corresponding to each of the antennas, reception strengths of uplink signals received from each of the antennas, IDs of UEs that transmitted each of the uplink signals, and identification numbers of the antennas;
generate a location mapping table by mapping the reception strength of the uplink signal for each ID of UEs received in each of the antennas for the identification number of each of the antennas; and
determine a partial service of a antenna receiving the uplink signal with a reception strength corresponding to a maximum reception strength level for the each of the UEs as a location of the each of the UEs.

12. The BS of claim 11, wherein the reception strength levels comprise a "weak" level, a "medium" level, and a "strong" level.

13. The BS of claim 8, wherein the antennas comprise Remote Radio Heads (RRHs) arranged in a star-shaped connection structure.

14. The BS of claim 8, wherein an entire service area of the BS comprises a plurality of partial service areas, each of the partial service areas is corresponded to a service area for each of the antennas.

15. A Base Station (BS) for determining a location of a User Equipment (UE) in a communication system, the BS comprising:
a receiver configured to receive through each of a plurality of antennas connected to the BS by cable reception signal information related to an uplink signal transmitted from the UE;
a transmitter configured to transmit configuration information to the UE; and
a controller configured to identify an antenna having a partial service area in which the UE is located, use the reception signal information, and determine the partial service area of the identified antenna to be the location of the UE,
wherein the reception signal information comprises a reception strength of the uplink signal, the reception strength of the uplink signal being expressed as one of a plurality of reception strength levels, each reception strength level corresponding to a different predetermined strength range, the one reception strength level corresponding to the predetermined strength range in which the reception strength of the uplink signal is included.

16. The BS of claim 15, wherein the reception signal information further comprises an identifier (ID) of the UE that transmitted the uplink signal and an identification number of the antenna that received the uplink signal.

17. The BS of claim 16, wherein the uplink signal is one of a Physical Random Access Channel (PRACH) signal, a Sounding Reference Signal (SRS), a Scheduling Request (SR) signal, and an Orthogonal Frequency Division Multiplexing (OFDM) symbol.

18. The BS of claim 16, wherein the controller is configured to:
acquire, from the each of the reception signal information corresponding to each of the antennas, reception strengths of uplink signals received from each of the antennas, IDs of UEs that transmitted each of the uplink signals, and identification numbers of the antennas;
generate a location mapping table by mapping the reception strength of the uplink signal for each ID of UEs received in each of the antennas for the identification number of each of the antennas; and
determine a partial service of a antenna receiving the uplink signal with a reception strength corresponding to a maximum reception strength level for the each of the UEs as a location of the each of the UEs.

19. The BS of claim 18, wherein the reception strength levels comprise a "weak" level, a "medium" level, and a "strong" level.

20. The BS of claim 15, wherein an entire service area of the BS comprises a plurality of partial service areas, each of the partial service areas is corresponded to a service area for each of the antennas.

* * * * *